United States Patent
Neupärtl et al.

(10) Patent No.: US 9,244,454 B2
(45) Date of Patent: Jan. 26, 2016

(54) CONTROL SYSTEM FOR CONTROLLING SAFETY-CRITICAL AND NON-SAFETY-CRITICAL PROCESSES

(75) Inventors: Heinrich Neupärtl, Lampertheim (DE); Gernot Gaub, Hockenheim (DE); Jürgen Stoll, Brühl (DE); Brigitte Blei, Berlin (DE); Yauheni Veryha, Mannheim (DE)

(73) Assignee: ABB AG, Mannheim (DE)

( * ) Notice: Subject to any disclaimer, the term of this patent is extended or adjusted under 35 U.S.C. 154(b) by 807 days.

(21) Appl. No.: 13/478,645

(22) Filed: May 23, 2012

(65) Prior Publication Data
US 2012/0296446 A1    Nov. 22, 2012

Related U.S. Application Data

(63) Continuation of application No. PCT/EP2010/006519, filed on Oct. 26, 2010.

(30) Foreign Application Priority Data

Nov. 23, 2009  (DE) .......................... 10 2009 054 157

(51) Int. Cl.
*G05B 15/00* (2006.01)
*G05B 19/042* (2006.01)

(52) U.S. Cl.
CPC .... *G05B 19/0428* (2013.01); *G05B 2219/2205* (2013.01); *G05B 2219/24188* (2013.01); *G05B 2219/24189* (2013.01); *G05B 2219/24191* (2013.01); *G05B 2219/25431* (2013.01)

(58) Field of Classification Search
CPC .................. G05B 19/0428; G05B 2219/2205; G05B 2219/24188; G05B 2219/24189; G05B 2219/24191; G05B 2219/25431
See application file for complete search history.

(56) References Cited

U.S. PATENT DOCUMENTS 6,104,971 A    8/2000  Fackler
6,532,508 B2 *  3/2003  Heckel et al. ................. 710/110
(Continued)

FOREIGN PATENT DOCUMENTS

DE    196 16 166 A1    10/1997
DE    103 53 950 A1    6/2005
(Continued)

OTHER PUBLICATIONS

International Search Report (PCT/ISA/210) issued on Mar. 1, 2011, by the European Patent Office as the International Searching Authority for International Application No. PCT/EP2010/006519.

*Primary Examiner* — M. N. Von Buhr
(74) *Attorney, Agent, or Firm* — Buchanan Ingersoll & Rooney PC

(57) ABSTRACT

A control system controls safety-critical and non-safety-critical processes and/or system components. The system includes a first control unit for controlling the non-safety-critical process and/or the non-safety-critical system components, at least one input/output unit connected to the first control unit, a communication coupler, which is connected to the first control unit via an internal coupler bus, and a second control unit for controlling the safety-critical process and/or the safety-critical system components. For providing safety-related functions, the second control unit includes a first dual-port RAM and at least two processors, only one of which is connected to the first dual-port RAM. The second control unit communicates with the first control unit via the first dual-port RAM and the internal coupler bus, and the first control unit transmits data from the second control unit to the communication coupler via the internal coupler bus and a second dual-port RAM integrated into the communication coupler.

20 Claims, 3 Drawing Sheets

(56) References Cited

U.S. PATENT DOCUMENTS

| | | |
|---|---|---|
| 7,269,465 B2 * | 9/2007 | Esch et al. ............... 700/21 |
| 7,813,813 B2 * | 10/2010 | Muneta et al. ............ 700/1 |
| 8,509,927 B2 * | 8/2013 | Schmidt et al. ........... 700/79 |
| 8,539,448 B2 * | 9/2013 | Neupartl et al. .......... 717/124 |
| 2005/0149207 A1 | 7/2005 | Esch et al. |
| 2006/0200257 A1 | 9/2006 | Kirste et al. |
| 2012/0297101 A1 * | 11/2012 | Neupartl et al. .......... 710/110 |

FOREIGN PATENT DOCUMENTS

| | | |
|---|---|---|
| DE | 10 2004 056363 A1 | 6/2006 |
| DE | 10 2005 009795 A1 | 9/2006 |

* cited by examiner

CONTROL SYSTEM FOR CONTROLLING SAFETY-CRITICAL AND NON-SAFETY-CRITICAL PROCESSES

RELATED APPLICATIONS

This application claims priority as a continuation application under 35 U.S.C. §120 to PCT/EP2010/006519, which was filed as an International Application on Oct. 26, 2010 designating the U.S., and which claims priority to German Application 10 2009 054 157.8 filed in Germany on Nov. 23, 2009. The entire contents of these applications are hereby incorporated by reference in their entireties.

FIELD

The present disclosure relates to a control system, which may be of a modular construction, for controlling safety-critical and non-safety-critical processes and/or plant components. The present disclosure is applicable in, for example, process automation or machine control.

BACKGROUND INFORMATION

Automation systems for controlling a technical process or a technical plant often require particular safety-critical process or plant components to be controlled separately from non-safety-critical components.

In DE 10 2005 009 795 A1, a microprocessor system which includes two areas is disclosed for a machine control in safety-critical applications. A first area is provided for non-safety-critical or non-safety-oriented functions, respectively, and includes a main processor, a program and data memory, an input/output unit and a bus for connecting the aforementioned components with one another. A second area is provided for safety-critical or safety-oriented functions, respectively, and includes a safety processor having its own program and data memory which is also connected to the bus.

By means of a secure transmission link, programs and data are loaded into the data memory of the safety processor, the function of which is based on the fact that it drives, in collaboration with other safety-oriented components such as, for example, safety-oriented input/output units, the plant or the process into a "safe" state in the case of a conflict.

In DE 103 53 950 A1, another control system is disclosed for controlling safety-critical processes. This control system includes a field bus, a bus master for controlling the communication via the field bus and a signal unit for linking up with the safety-critical process. The bus master and the signal unit are connected to one another via the field bus. Communication of the signal unit with the bus master is provided via the field bus. Furthermore, a first control unit for controlling the safety-critical process is provided, wherein the signal unit and the first control unit have safety-related facilities for failsafe communication for controlling the safety-critical processes. The first control unit can be connected field-bus-independently to the bus master.

The safety-oriented control systems described above are not provided for use in modularly configured control systems as described, for example, in DE 10 2004 056 363 A1 or can be integrated only with additional expenditure since, for example, communication modules, interfaces, voltage supplies and monitoring functions must be matched to the safety criteria specified. For this purpose, these components must be replaced and equipped with new software as a result of which considerable costs arise.

It is often also difficult to separate the safety-critical functions unambiguously from the non-safety-critical functions.

SUMMARY

An exemplary embodiment of the present disclosure provides a control system for controlling safety-critical and non-safety-critical processes and/or plant components. The exemplary control system includes at least one first control unit configured to control the non-safety-critical process and/or the non-safety-critical plant components. The exemplary control system also includes at least one input/output unit which is connected to the first control unit via an internal input/output bus and includes at least one communication coupler, which is connected to the first control unit via an internal coupler bus and is configured to be connected to further decentralized units via a field bus. In addition, the exemplary control system includes at least one second control unit configured to control the safety-critical process and/or the safety-critical plant components. The second control unit includes at least two processors and a first dual-port RAM for providing safety-oriented functions, only one of the two processors being connected to the first dual-port RAM. The communication coupler includes a second dual-port RAM integrated therein. The second control unit is configured to communicate with the first control unit via the first dual-port RAM and the internal coupler bus. The first control unit is configured to transmit data from the second control unit to the communication coupler via the internal coupler bus and the second dual-port RAM integrated in the communication coupler.

BRIEF DESCRIPTION OF THE DRAWINGS

Additional refinements, advantages and features of the present disclosure are described in more detail below with reference to exemplary embodiments illustrated in the drawings, in which.

DETAILED DESCRIPTION

Figure 1:
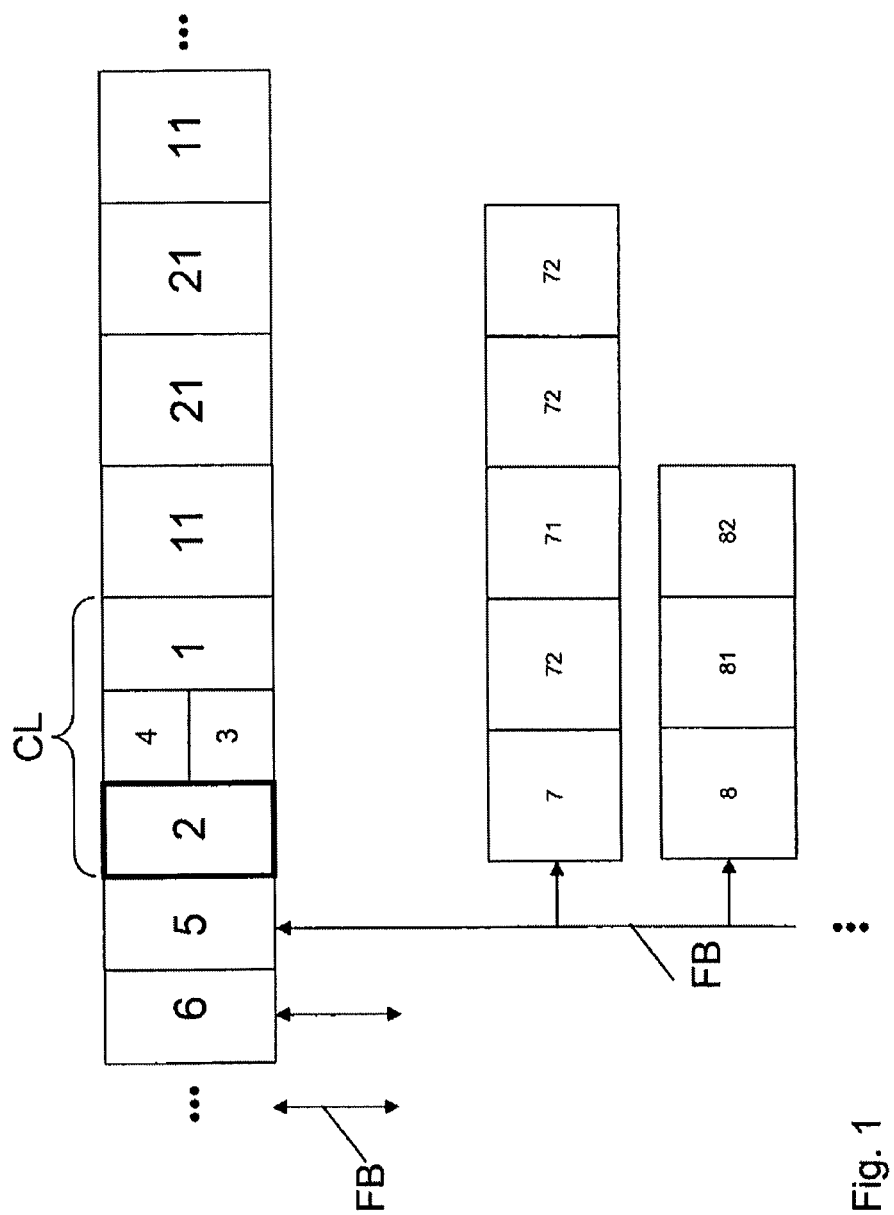
FIG. 1 shows an exemplary embodiment of modular construction of a control system according to the present disclosure, which is provided for controlling safety-oriented and non-safety-oriented processes.

Exemplary embodiments of the present disclosure provide a control and/or automation system, which may be of a modular construction, for controlling safety-critical and non-safety-critical processes and/or plant components, which avoids the disadvantages of known techniques as described above. In accordance with an exemplary embodiment, the control system according to the present disclosure is suitable for equipping an existing non-safe control system of a modular construction with a safety-oriented controller in a simple and cost-effective manner.

Exemplary features, aspects and advantages of the control system according to the present disclosure are described in more detail below.

In accordance with an exemplary embodiment, the control system according to the present disclosure, which may be of a modular construction, controls safety-critical and non-safety-critical processes and/or plant components. The control system includes at least one first control unit which is configured to control the non-safety-critical process and/or the non-safety-critical plant components, and at least one input/output unit which is connected to the first control unit via an internal input/output bus. The exemplary control system can optionally also include at least one communication coupler which is connected to the first control unit via an internal coupler bus and/or can be connected to further decentralized units such as, for example, input/output units and/or remote stations via a field bus.

In accordance with an exemplary embodiment, the communication coupler can be constructed as a field bus master coupler.

According to an exemplary embodiment of the present disclosure, at least one second control unit, which may also be referred to as a safety controller, is provided for controlling the safety-critical process and/or the safety-critical plant components. For providing the safety-oriented functions, the safety controller has at least two processing units, which may be constructed as one or more microprocessors, and a first memory, which may be constructed as dual-port RAM, for data transmission via the internal coupler bus. The dual-port RAM in the safety controller is constructed in such a manner that simultaneous read and/or write accesses are possible at its two access sides so that simultaneous access for two otherwise separate systems is possible which operate with common data, without the otherwise separate systems restricting one another mutually in the access rate.

The safety controller communicates via its dual-port RAM, which may also be referred to as a first dual-port RAM, and the internal coupler bus via the non-safety-critical first control unit directly with further communication couplers. In this context, the data provided by the second control unit are first transmitted to the first control unit via the first dual-port RAM of the safety controller and the internal coupler bus. The first control unit then transmits the data provided by the second control unit to the communication coupler via the internal coupler bus and a further dual-port RAM integrated in the communication coupler.

Such a control system of modular construction, having a first control unit for controlling non-safety-critical applications and a second control unit (safety controller) for controlling safety-critical applications can be used flexibly in different functions, for example, as a control system for a relatively large automation system, as a decentralized processing facility in such a decentralized relatively large automation system, or as stand-alone automation device in conjunction with the locally coupleable input/output devices or as central automation device, etc.

An advantage of the control system according to the present disclosure is based on a reduction of interfaces for the communication of the respective control units for the safety-critical and non-safety-critical functions.

By using the safety controller for controlling the safety-critical process or the safety-critical plant components and the associated separating of the functions between the first, non-safety-oriented control unit and the safety controller, the existing communication interfaces to the non-safety-oriented control unit are reused in the safety controller which leads to a distinct simplification of the safety controller design. In this context, it is found to be advantageous that predefined interfaces are provided with the dual-port RAM used.

Another advantage of the control system according to the present disclosure results from the fact that a control system, which may be of a modular construction, for non-safety-critical applications can also be upgraded for safety-critical applications in a simple and cost-effective manner without extensive hardware expenditure in that, for using the control system also for safety-critical application, the existing hardware only needs to be supplemented by the second control unit (safety controller) with its at least two processors, the at least one dual-port RAM and the internal coupler bus.

In this context, the non-safety-oriented control unit takes over the task of transferring the safety-oriented messages from the safety controller of the control system via the internal coupler bus and the internal input/output bus or the communication couplers constructed as field bus master couplers, respectively, to the safety-oriented input/output units by using the so-called "Black Channel Communication principle" during a system set-up. The Black Channel Communication principle is known, for example, from "PROFIsafe—Profile for Safety Technology on PROFIBUS DP and PROFINET IO Profile part, related to IEC 61784-3-3 Specification for PROFIBUS and PROFINET, Version 2.4, March 2007, Order No. 3.192b".

The field bus master couplers are also provided for transmitting the safety-oriented messages from and to the decentralized safety-oriented input/output modules and/or to the remote stations by utilizing the aforementioned "Black Channel Communication principle". For this purpose, the messages are carried via so-called field bus slaves to the safety-oriented input/output units. For this purpose, the field bus slaves can have direct non-safety-oriented input/output channels.

In the safety controller, a so-called safety program logic is executed and, separately from this, a non-safety-oriented program logic is executed in the controller for the non-safety-critical applications. The exchange of data between the safety controller and the non-safety-oriented first control unit for the safety-critical applications takes place by means of the predefined interface via the dual-port RAM and the coupler bus.

Of the two processors of the safety controller, only one processor is connected directly to the internal coupler bus via the dual-port RAM. The processors of the safety controller are constructed in such a manner that they monitor and synchronize one another. The monitoring and synchronization mechanisms can be constructed, for example, in accordance with "PROFIsafe—Profile for Safety Technology on PROFIBUS DP and PROFINET IO Profile part, related to IEC 61784-3-3 Specification for PROFIBUS and PROFINET, Version 2.4, March 2007, Order No. 3.192b" or the like.

In addition, another internal safety architecture than that described above may be provided in the safety controller, such as a 1oo2 (1-out-of-2-) architecture including two processors, for example a 1oo3 architecture etc. In the 1oo2 architecture described, the first processor, which accesses the dual-port RAM directly, is not capable of determining a cyclic redundancy checksum (CRC—a method for determining a test value for data in order to be able to recognize errors in the transmission or storage) which is necessary for generating valid messages via the interface of the dual-port RAM. This CRC determination can only be carried out by the redundant processor and passes on to the first processor. This ensures that both processors collaborate on valid messages. This is necessary in order to guarantee the safety of the system in the case of a failure or faulty operation of one of the two processors of the safety controller.

FIG. 1 shows a control or automation system, respectively, which is of a modular construction, having a first control unit 1 which is provided for controlling non-safety-critical processes and/or non-safety-critical plant components, with modules, connected thereto, of the central input/output units 11, 21 which are connected to the first control unit 1 via an internal input/output bus, and with a communication coupler module 5, 6, which may be constructed as field bus master coupler, and which controls the communication via the field bus FB with a plurality of decentralized field bus slaves 7, 8 and input/output units 71, 72, 81, 82 connected to these.

According to an exemplary embodiment of the present disclosure, at least one second control unit 2 (safety controller) is provided for controlling safety-critical and/or safety-critical plant components. The safety controller 2 communicates via its dual-port RAM and the internal coupler bus B1 and via the non-safety-critical control unit 1 directly with further communication couplers 5, 6.

The input and output units include both safe units 21, 72, 82 and non-safe units 11, 71, 81, wherein the non-safe units 11, 71, 81 are controlled by the first control unit 1 without a safety function, and the safe units 21, 72, 81 are controlled by the safety controller with a safety function.

Control units 1, 2 communicate with one another via an internal coupler bus B1 and a dual-port RAM DPR1, which is integrated in the second control unit 2, and with the decentralized units connected to the field bus FB via the internal coupler bus B1 and communication coupler module 5, 6.

The first control unit 1 forms with a voltage supply unit 3 and a display and/or operating unit 4 a module for the central processing unit CPU of the control system.

Both the modules connected directly to the module for the central processing unit CPU, of the central input/output units 11, 21 and the modules of the decentralized units 7, 8, 71, 72, 81, 82 can be constructed both as safety-oriented and non-safety-oriented devices in accordance with their function as already stated before.

The central processing unit CPU, like the input/output units 11, 21 and the communication couplers 5, 6 can also be arranged on a differently upgradable base plate by means of a module carrier, wherein the input/output units 11, 21 can be coupled directly to the central processing unit CPU and the communication couplers 5. The base plate also has at least one plug-in location for a coupler to the field bus terminal for a standard field bus connection to the decentralized units 7, 8 and/or stations.

In accordance with an exemplary embodiment, the base plate is snapped on to a standard cap rail wherein at least one of the input/output units 11, 21 can also be snapped on to the cap rail and can be plugged together electrically and mechanically with the respective base plate.

It is also found to be advantageous that modules of the central processing unit CPU, of the input/output units 11, 21 and the communication couplers 5, 6 all can be connected or are connected electrically cablelessly to one another via plug-in connections. The central processing unit CPU, the input/output units 11, 21 and the communication couplers 5, 6 can be connected (e.g., detachably) to one another by means of plug-in and/or locking means.

Figure 2:
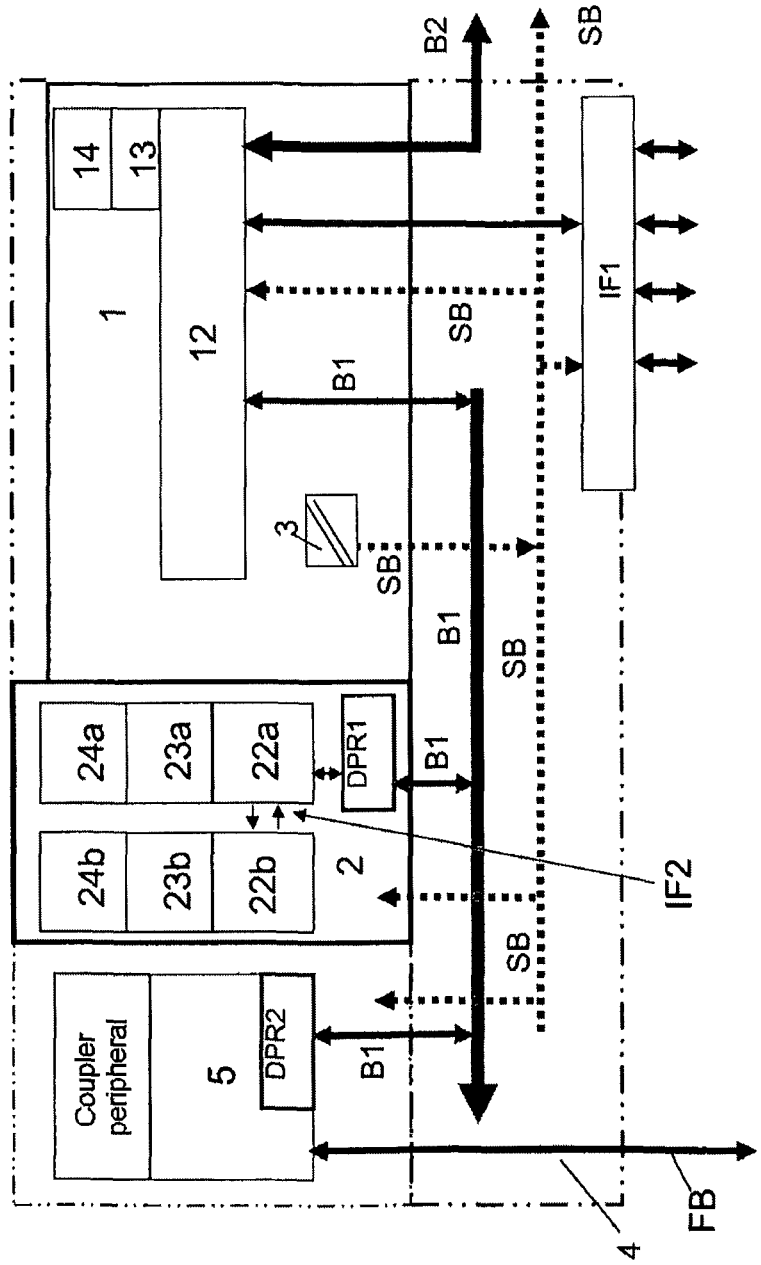
FIG. 2 shows an exemplary embodiment of the control system according to the disclosure.

FIG. 2 shows an exemplary embodiment of a modular construction of the control system according to the present disclosure, which includes a terminal block 4 with integrated Ethernet and/or serial interface IF1 and the first control unit 1 which communicates with the second control unit 2 constructed as safety controller and the communication coupler 5 via the internal input/output coupler bus B1. The module of the first control unit 1 is equipped with a voltage supply unit 3 which is connected electrically to the first and the second control units 1, 2 and the communication coupler 5 via a connecting line SB. Other devices arranged on the base plate such as, for example, the central input/output units 11, 21 can also be connected electrically to the connecting line SB.

The first control unit 1 has, apart from a clock generator 14 and a memory 13, a first microprocessor 12 which communicates via the internal input/output coupler bus B1 with the at least one communication coupler 5 via a further dual-port RAM DPR2 integrated in the communication coupler. The connection to the central input/output units 11, 21 is implemented via the internal input/output bus B2.

In order to also apply the control system for safety-critical application, the second control unit 2, which has at least two further processing units 22a, 22b, constructed as safety processors, with associated memories 23a, 23b and clock generators 24a, 24b, respectively, is provided on the base plate. The processors 22a, 22b synchronize one another via a further interface IF2. The structure of the processors 22a, 22b and their operation is known from the relevant prior art.

In the 1oo2 architecture described, the first processor 22a, which accesses the dual-port RAM DPR1 directly, is not capable of determining a Cyclic Redundancy Checksum (CRC) which is necessary for generating valid messages via the interface of the dual-port RAM DPR1. This CRC determination can only be carried out by the redundant processor 22b and passes on to the first processor 22a. This ensures that both processors 22a, 22b collaborate on valid messages. This is required in order to guarantee the safety of the system in the case of a failure or faulty operation of one of the two processors 22a, 22b of the safety controller 2.

Via the further dual-port RAM DPR2 integrated in the communication coupler 5, the safety-oriented messages from the safety controller 2 are transmitted from and to the decentralized input/output units 71, 72, 81, 82 and/or to the remote stations by utilizing the aforementioned "Black Channel Communication principle". For this purpose, the messages are conducted via the field bus FB and the field bus slaves 7, 8 to the input/output units 71, 72, 81, 82.

The safety controller 2 communicates via its dual-port RAM DPR1 and the internal coupler bus B1 via the non-safety-critical first control unit 1 with communication coupler 5 via integrated dual-port RAM DPR2. The communication is carried out by utilizing the aforementioned "Black Channel Communication principle".

In the further processors 22a, 22b of the safety controller 2, a safety program logic is executed and a non-safety-oriented program logic is executed separately from this in the first microprocessor 12 of the first control unit 1. The exchange of the data between the as safety controller 2 and the first control unit 1 for the non-safety-critical applications takes place by means of the predefined interface via the first dual-port RAM DPR1 arranged in the safety controller.

Figure 3:
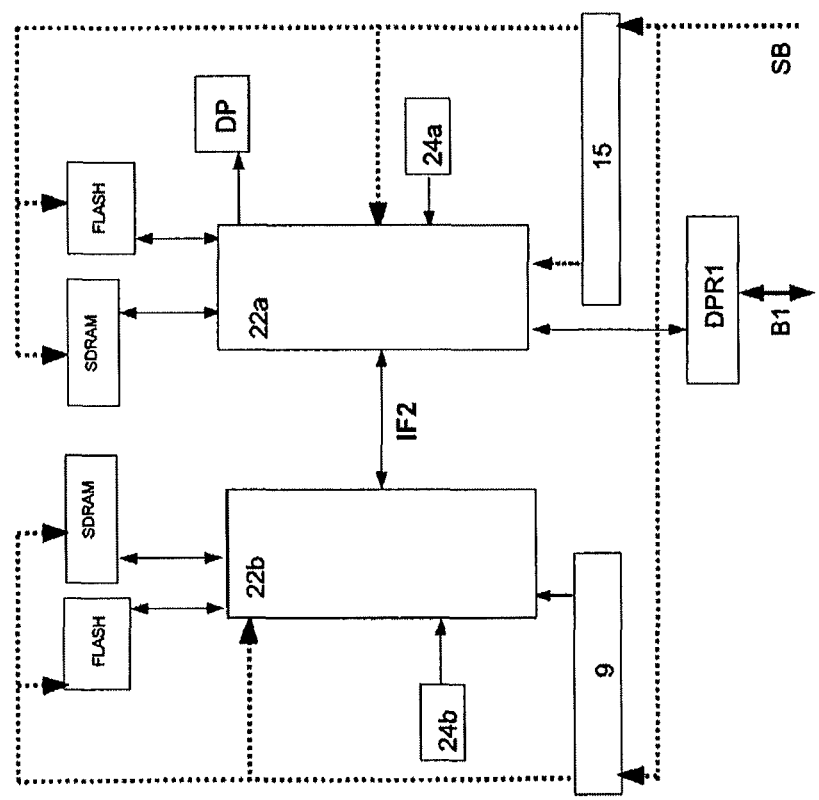
FIG. 3 shows an exemplary embodiment of a 1oo2 system architecture of a second control unit included in the control system of the present disclosure.

FIG. 3 shows an exemplary embodiment of the safety controller 2 as a 1oo2 system architecture with microprocessors 22a, 22b, having in each case separate zero-voltage-proof FLASH memories, which may be provided as a depository for a user program, interacting with the processors 22a, 22b, and the volatile memories SDRAM, which may be provided as data memories. The microprocessors 22a, 22b in each case cooperate with a separate clock generator 24a, 24b. Furthermore, display means DP for displaying status and error messages, which may be connected directly only to the first processor 22a are provided in the safety controller 2.

Of the two processors 22a, 22b of the safety controller 2, only the first processor 22a is connected directly to the internal coupler bus B1 via the first dual-port RAM DPR1.

In accordance with an exemplary embodiment, the processors 22a, 22b of the safety controller 2 are constructed in such a manner that they monitor one another. For this purpose, the processors 22a, 22b synchronize one another via the further interface IF2. The monitoring and synchronization mechanisms can be constructed, for example, in accordance with "PROFIsafe—Profile for Safety Technology on PROFIBUS DP and PROFINET IO Profile part, related to IEC 61784-3-3 Specification for PROFIBUS and PROFINET, Version 2.4, March 2007, Order No. 3.192b" or the like.

The voltage supply SB both for the two processors 22a, 22b, the FLASH SDRAM memories and for the voltage supply monitoring and diagnostic units 9, in each case connected to the processors 22a, 22b is provided via the connecting line SB.

For the processors 22a, 22b located in the safety controller 2, a separate voltage supply monitoring and diagnostic unit 9, 15 is in each case provided.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A control system for controlling safety-critical and non-safety-critical processes and/or plant components, the control system comprising:
   at least one first control unit configured to control the non-safety-critical process and/or the non-safety-critical plant components;
   at least one input/output unit which is connected to the first control unit via an internal input/output bus;
   at least one communication coupler, which is connected to the first control unit via an internal coupler bus and is configured to be connected to further decentralized units via a field bus; and
   at least one second control unit configured to control the safety-critical process and/or the safety-critical plant components, wherein:
      the second control unit includes at least two processors and a first dual-port RAM for providing safety-oriented functions, only one of the two processors being connected to the first dual-port RAM;
      the communication coupler includes a second dual-port RAM integrated therein;
      the second control unit is configured to communicate with the first control unit via the first dual-port RAM and the internal coupler bus; and
      the first control unit is configured to transmit data from the second control unit to the communication coupler via the internal coupler bus and the second dual-port RAM integrated in the communication coupler.

2. The control system as claimed in claim 1, wherein the control system is constructed to be modular.

3. The control system as claimed in claim 1, wherein the input/output units are respectively configured to function as one of safe units and non-safe units, and
   wherein the non-safe units are configured to be controlled by the first control unit, and the safe units are configured to be controlled by the second control unit.

4. The control system as claimed in claim 1, wherein the communication coupler is constructed as a field bus master coupler.

5. The control system as claimed in claim 1, wherein:
   the input/output units are decentralized;
   the field bus master coupler is configured to transmit safety-oriented messages from and to the decentralized input/output modules and/or to remote stations by utilizing the Black Channel Communication principle;
   field bus slaves connected to the field master coupler via the field bus; and
   the safety-oriented messages are conducted via the field bus slaves to the decentralized input/output units.

6. The control system as claimed in claim 5, wherein the field bus slaves have direct non-safety-oriented input/output channels to the decentralized input/output units.

7. The control system as claimed in claim 5, wherein at least one decentralized input/output unit is connected with the field bus slaves via at least the field bus.

8. The control system as claimed in claim 1, wherein at least one of the first and second dual-port RAMs have predefined standard interfaces.

9. The control system as claimed in claim 1, wherein the processors of the second control unit are configured to monitor and synchronize one another.

10. The control system as claimed in claim 1, wherein the decentralized input/output units are safety-oriented input/output units and during a system set-up, the first control unit is configured to transmit safety-oriented messages from the second control unit via the internal coupler bus and the internal input/output bus to the safety-oriented input/output units by using the Black Channel Communication principle.

11. The control system as claimed in claim 1, wherein the control system is configured to be implemented in an automation system, as a decentralized processing facility in a decentralized automation system, as a stand-alone automation device in conjunction with the input/output devices which are coupleable in a decentralized manner, and as central automation device, or any combination thereof.

12. The control system as claimed in claim 2, wherein the input/output units are respectively configured to function as one of safe units and non-safe units, and
   wherein the non-safe units are configured to be controlled by the first control unit, and the safe units are configured to be controlled by the second control unit.

13. The control system as claimed in claim 12, wherein the communication coupler is constructed as a field bus master coupler.

14. The control system as claimed in claim 12, wherein:
   the input/output units are decentralized;
   the field bus master coupler is configured to transmit safety-oriented messages from and to the decentralized input/output modules and/or to remote stations by utilizing the Black Channel Communication principle;
   field bus slaves connected to the field master coupler via the field bus; and
   the safety-oriented messages are conducted via the field bus slaves to the decentralized input/output units.

15. The control system as claimed in claim 14, wherein the field bus slaves have direct non-safety-oriented input/output channels to the decentralized input/output units.

16. The control system as claimed in claim 15, wherein at least one decentralized input/output unit is connected with the field bus slaves via at least the field bus.

17. The control system as claimed in claim 14, wherein at least one of the first and second dual-port RAMs have predefined standard interfaces.

18. The control system as claimed in claim 14, wherein the processors of the second control unit are configured to monitor and synchronize one another.

19. The control system as claimed in claim 14, wherein the decentralized input/output units are safety-oriented input/output units and during a system set-up, the first control unit is configured to transmit safety-oriented messages from the second control unit via the internal coupler bus and the internal input/output bus to the safety-oriented input/output units by using the Black Channel Communication principle.

20. The control system as claimed in claim 14, wherein the control system is configured to be implemented in an automation system, and as a decentralized processing facility in a decentralized automation system, as a stand-alone automation device in conjunction with the input/output devices which are coupleable in a decentralized manner, and as central automation device, or any combination thereof.

* * * * *